Oct. 24, 1950  P. E. HAWKINSON  2,526,746
TIRE TREAD

Filed Oct. 18, 1947  2 Sheets-Sheet 1

Inventor
Paul E. Hawkinson
By his Attorneys
Merchant & Merchant

Oct. 24, 1950  P. E. HAWKINSON  2,526,746
TIRE TREAD
Filed Oct. 18, 1947  2 Sheets-Sheet 2
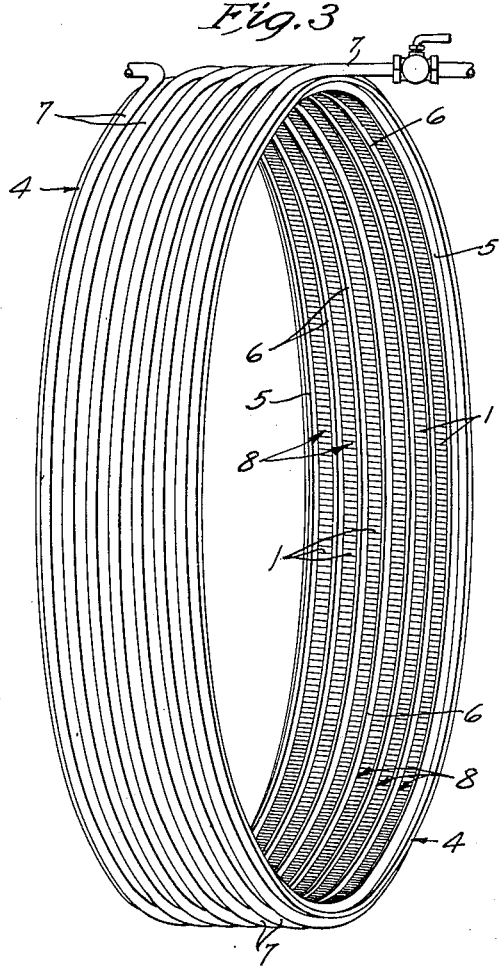
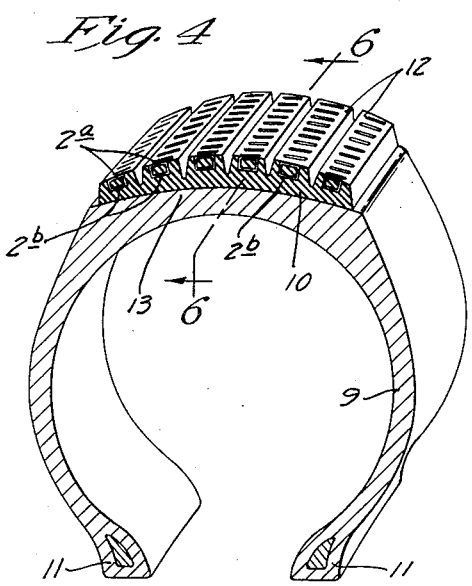
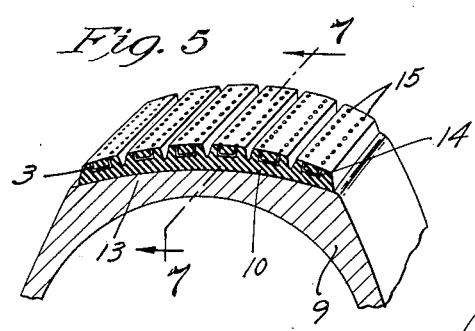
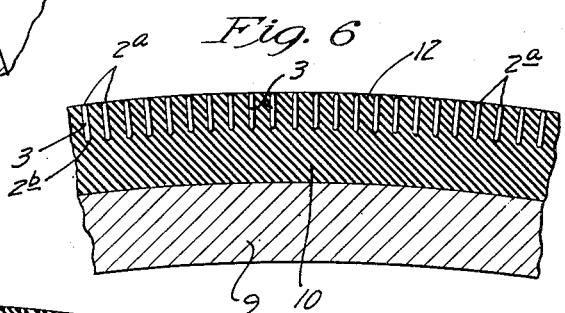
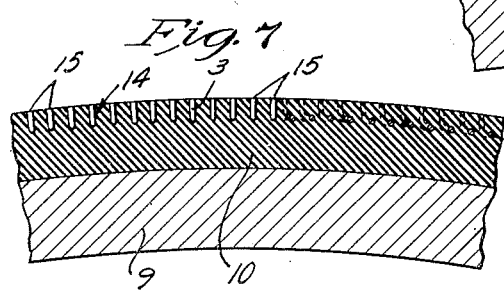
Inventor
Paul E. Hawkinson
By his Attorneys
Merchant & Merchant Patented Oct. 24, 1950

2,526,746

UNITED STATES PATENT OFFICE 2,526,746

TIRE TREAD

Paul E. Hawkinson, Minneapolis, Minn., assignor to Paul E. Hawkinson Company, Minneapolis, Minn., a corporation of Minnesota Application October 18, 1947, Serial No. 780,723

1 Claim. (Cl. 152—211)

My invention relates to skid-resistant treads for pneumatic tires and, more particularly, to such tire treads which have imbedded therein lengths of angular or coiled wire.

The object of my invention is to provide a tread which has greater skid resistance for a longer period of time than any tread heretofore developed.

I am aware that, in the past, numerous treads have been produced having imbedded therein angular lengths including circular coils of wire, a plurality of points of which, under wear of the tread, become exposed and contact the road surface. However, it is a common weakness of all wires heretofore used in such treads that, as they become divided into a plurality of disconnected segments or pieces by wear of the tread, the said segments or pieces become readily broken up and dislodged from the tread, thus rendering the tread far less skid-resistant. This weakness is due both to the angle at which the wire segments or pieces contact the road-engaging surface and to the fact that there is an insufficient base in each wire segment, or piece (deeply imbedded within the tire), to withstand the shock of impact with the road under load. As a result, undue flexation is imparted to each wire segment or piece upon each rotation of the tire as it contacts the road, thereby breaking up the segments or pieces and allowing them to become dislodged from the tread.

I have found that, by utilizing a rectangular coil of wire and positioning the coil within the tread in such a manner that two sides thereof are substantially parallel to the road with the other two sides substantially perpendicular to the road, not only is the tendency of the individual pieces to break up and become dislodged from the tread greatly lessened, but also that the skid-resistance of the tread is greatly improved.

Furthermore, I have found that placing the coils of rectangular wire in the Hawkinson type mold, such as disclosed and broadly claimed in my earlier Patent No. 1,917,262, greatly facilitates retaining the rectangular coils of wire in the desired position while curing.

The above and still further objects and advantages of my invention will become apparent from the following detailed specification, appended claim, and attached drawings.

Referring to the drawings, wherein like characters indicate like parts throughout the several views:

Fig. 3 is a perspective view of a tire mold having a plurality of wire coils applied thereto;

Fig. 4 is a fragmentary perspective view of a tire immediately after removal from the mold and showing the rectangular coils of wires imbedded in the tread;

Fig. 5 is a view corresponding to Fig. 4, but showing the condition of the rectangular coil as a result of wear;

Fig. 6 is an enlarged transverse section taken on the line 6—6 of Fig. 4; and

Fig. 7 is an enlarged transverse section taken on the line 7—7 of Fig. 5.

Figure 2:
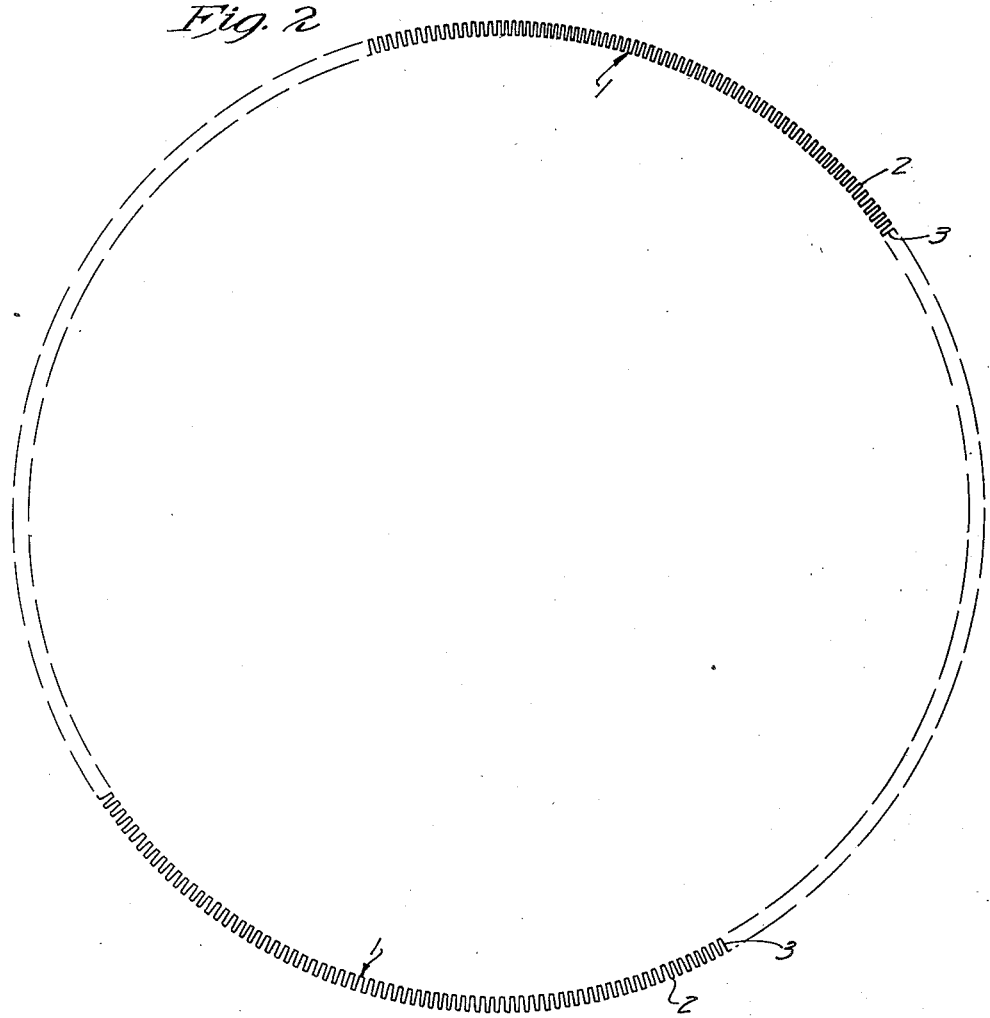
Fig. 2 is a diagrammatic view in side elevation of the coil spring, shown in Fig. 1, bent into circular form prior to insertion thereof into a tire treading mold.

Referring with greater particularity to the drawings, the numeral I indicates a coil of wire having convolutions which are rectangular in cross section, which form opposed parallel side sections 2 and opposed substantially parallel end sections 3. Preferably, the coil I is made from low carbon steel which has some resilience but is capable of being easily formed. Furthermore, the coil is initially wound on the straight mandrel or die so that, when the coil is bent into a circular form, as illustrated in Fig. 2, it will have a definite tendency to straighten itself out or assume the position in which it is formed. The mold, illustrated in Fig. 3, is of the well-known Hawkinson type, as above indicated, and is formed from sheet metal or the like to provide a cylinder-like ring 4 which has laterally-spaced confining flanges 5 adjacent its edges and a plurality of circumferentially-extended tread design-forming ribs 6 between the confining flanges 5. An endless heating coil 7 extends about the external periphery of the mold. The confining flanges 5 and ribs 6 define a plurality of circumferentially-extended channels 8.

Figure 1:
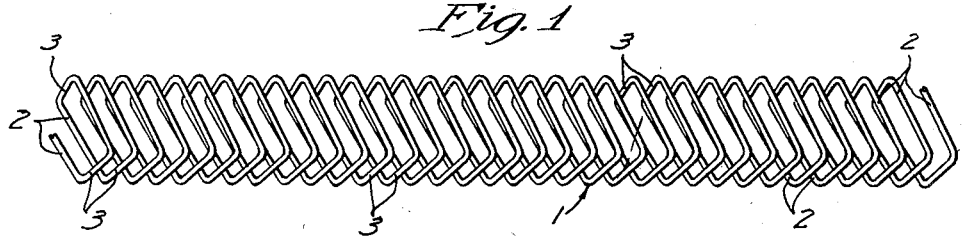
Fig. 1 is a fragmentary perspective view of a length of rectangular coiled wire, such as is used in my novel tread.

When it is desired to place a length of coiled wire I within the mold 4, the coil I is bent into a circular shape, such as shown in Fig. 2, of less diameter than the mold 4. The circular length of wire so formed is then placed within the mold where it is allowed to expand into the desired channel 8 by virtue of its tendency to straighten out. Any desired number of coils are similarly inserted into the mold 4. It is important to note that, due to the tendency of the coil I to assume its straightened position as illustrated in Fig. 1, said coil is held within the channels 8 while the mold 4 is being lifted to and positioned over a tire 9 to the crown portion of which a strip of tread stock 10, in an uncured condition, has been placed. It is to be assumed, however, that the crown portion of the tire 9 has, prior to placing of the mold 4 thereover, been circumferentially and radially contracted by spreading the beads 11 thereof laterally, as disclosed and broadly claimed in my earlier Patent Re. 29,516.

As also disclosed in said earlier patent, the next step in the particular process here used to apply and cure the tread is the releasing of the beads 11 to permit expansion of the tire 9 and of the tread stock 10 against the ribs 6 of the mold 4. An inner tube is next placed into the tire casing 9, a rim placed thereon, air is introduced into the inner tube, and live steam or other fluid heat is introduced into the heater coil 7. As the uncured strip of tread stock 10 becomes fluid under the heat of the mold 4 and the internal pressure within the tire 9, the uncured tread strip 10 becomes sufficiently fluid to completely fill the channels 8 of the mold 4 and to thus completely imbed the rectangular coils 1 within the several ribs 12, immediately below the road-engaging surface thereof.

It will be noted, particularly by reference to Fig. 4, that the radially outer side section 2a of each rectangular convolution (which, in Fig. 3, was in contact with the inner peripheral surface of the mold 4) is not only parallel to the road but also that the same is in a position to contact the road surface even before any substantial wear on the tire tread 10 has been had. Thus, the tread 10 has great skid-resistant qualities immediately upon use thereof.

It will be also noted that the radially inner side sections 2b are substantially parallel to both the road-engaging surface and to the worn crown surface of the worn under tread 13. This is important not only in that the side sections 2a provide a wide flat base or anchor, but also due to the fact that the rectangular shape of each convolution makes possible the spacing of the wire at a maximum distance from the under tread 13 and the conventional fabric carcass of the tire 9.

As the cured tread stock 10 wears down, it will be noted, particularly by reference to Fig. 5, that a plurality of independent, disconnected U-shaped staples 14 result. However, the wearing off of the radially outer side sections 2a of each convolution does not affect the skid-resistant quality of the tread, for what is lost by the abrading away of the long side 2a is more than made up for by the relatively pointed outer ends 15 of the end sections 3. This latter fact is due, of course, to the further fact that the end sections 3 are substantially perpendicular to the road-engaging surface and are thus pressed uniformly radially outwardly by the weight of the load. Furthermore, the same degree of skid-resistance is retained by the tread until the end sections 3 are completely worn off. At this time, the bottom side sections 2b come into play for a limited period of time at the end of which they become completely dislodged from the tread 10 without danger of their being driven into the tread, due to the fact that they lie parallel to the road surface.

What I claim is:

A tire tread divided into at least two circumferentially-extended endless ribs, each of said ribs having imbedded therein immediately below the road-engaging tread surface thereof a coil of wire which extends completely thereabout, said coil being rectangular in formation and of slightly less width than the cross sectional dimension of said rib and being so positioned in said rib that two sides thereof are substantially parallel to and coextensive with the sides of said rib, and the other two sides being substantially parallel to said road-engaging surface of the rib.

PAUL E. HAWKINSON.

REFERENCES CITED

The following references are of record in the file of this patent:

UNITED STATES PATENTS

| Number | Name | Date |
| --- | --- | --- |
| 692,397 | Wilkinson | Feb. 4, 1902 |
| 865,288 | Baker | Sept. 3, 1907 |
| 1,740,616 | Midgley | Dec. 24, 1929 |
| 2,006,038 | Yamaki | June 25, 1935 |